United States Patent [19]

Adachi et al.

[11] Patent Number: 4,636,008
[45] Date of Patent: Jan. 13, 1987

[54] ANTI-SKID BRAKING CONTROL SYSTEM

[75] Inventors: Yoshiharu Adachi, Gamagohri; Tadao Saitoh, Nagoya; Takumi Nishimura, Chiryu, all of Japan

[73] Assignee: Aisin Seiki Kabushiki Kaisha, Kariya, Japan

[21] Appl. No.: 702,306

[22] Filed: Feb. 15, 1985

[30] Foreign Application Priority Data

Mar. 26, 1984 [JP] Japan .................. 59-059173

[51] Int. Cl.⁴ .............................................. B60T 8/02
[52] U.S. Cl. ...................... 303/92; 303/116
[58] Field of Search ............... 303/92, 114, 115, 116, 303/117, 119

[56] References Cited

U.S. PATENT DOCUMENTS

| | | | |
|---|---|---|---|
| 4,072,366 | 2/1978 | Kondo | 303/92 X |
| 4,264,111 | 4/1981 | Shimizu et al. | 303/92 X |
| 4,421,362 | 12/1983 | Shirai et al. | 303/92 X |
| 4,457,563 | 7/1984 | Farr | 303/92 |

Primary Examiner—Duane A. Reger
Attorney, Agent, or Firm—Oblon, Fisher, Spivak, McClelland & Maier

[57] ABSTRACT

An anti-skid braking control system which includes an actuator disposed in a braking fluid pressure circuit for controlling a braking fluid pressure. The actuator includes a body having a cylinder with one end closed by a closure member, an inlet port defined in the body and opening into the cylinder, the inlet port being connected through the braking fluid pressure circuit to a brake master cylinder, an outlet port defined in the body and opening into the cylinder, the outlet being connected through the braking fluid pressure circuit to a wheel brake actuating cylinder, a first valve disposed centrally in the cylinder between the inlet and outlet ports for cutting off fluid communication therebetween, a first piston disposed in one side of the cylinder and having an end on which a power fluid pressure from a fluid pressure source acts and an opposite end exposed in the braking fluid pressure circuit for engaging the first valve, the first piston being responsive to the power fluid pressure for moving the first valve to vary the volume of the braking fluid pressure circuit, a second piston disposed in an opposite side of the cylinder and having an end on which the power fluid pressure acts and actuatable by the braking fluid pressure in response to failure of the power fluid pressure, and a second valve for communicating the inlet and outlet ports directly with each other in response to operation of the second piston.

7 Claims, 3 Drawing Figures

4,636,008

ANTI-SKID BRAKING CONTROL SYSTEM

BACKGROUND OF THE INVENTION

1. Field of the Invention

The present invention relates to an anti-skid braking control system for use in a motor vehicle, and more particularly to an anti-skid braking control system having a brake master cylinder, a wheel brake actuating cylinder on a wheel, a braking fluid pressure circuit interconnecting the brake master cylinder and the wheel brake actuating cylinder, an actuator disposed in the braking fluid pressure circuit for controlling braking fluid pressure therein, a fluid pressure pump for generating a power fluid pressure to be supplied to the actuator, and a power fluid pressure supply and discharge valve for supplying and discharging the power fluid pressure to and from the actuator depending on a skidding condition of the vehicle. The anti-skid braking control system operates, when the brakes are actuated and when any one of the wheels of the vehicle is about to be locked, to reduce the braking fluid pressure in the wheel brake actuating cylinder by increasing the volume of the braking fluid pressure circuit, thus preventing the wheel from being locked and the vehicle from skidding.

2. Description of the Prior Art

One anti-skid braking control system is disclosed in Japanese Patent Publication No. 58-199258. The disclosed anti-skid braking control system includes a cylinder body having a first cylinder accommodating therein a piston for increasing and reducing the volume of a braking fluid pressure circuit leading from a brake master cylinder, to a wheel brake actuating cylinder a first valve for cutting off the braking fluid pressure circuit in response to operation of the piston, and a second valve disposed in a second cylinder defined in the cylinder body parallel to the first cylinder for providing fluid communication between the brake master cylinder and the wheel brake actuating cylinder in bypassing relation to the first valve.

The first and second cylinders are independently defined in the cylinder body with no parts being shared thereby, and hence the cylinder assembly is relatively large in size. Since the first and second cylinders are parallel to each other, fluid communication between the brake master cylinder and the wheel brake actuating cylinder through the second valve has been required to be made through a passage defined between the first and second cylinders remotely from the outer surface of the cylinder body.

SUMMARY OF THE INVENTION

It is an object of the present invention to provide an anti-skid braking control system including a small-size cylinder assembly having a cylinder accommodating a piston, a first valve, and a second valve.

According to the present invention, there is provided an anti-skid braking control system including an actuator disposed in a braking fluid pressure circuit for controlling a braking fluid pressure, the actuator comprising: a body having a cylinder with one end closed by a closure member; an inlet port defined in the body and opening into the cylinder; the inlet port being connected through the braking fluid pressure circuit to a brake master cylinder; an outlet port defined in the body and opening into the cylinder; the outlet being connected through the braking fluid pressure circuit to a wheel brake actuating cylinder; a first valve disposed centrally in the cylinder between the inlet and outlet ports for cutting off fluid communication therebetween; a first piston disposed in one side of the cylinder and having an end on which a power fluid pressure from a fluid pressure source acts and an opposite end exposed in the braking fluid pressure circuit for engaging the first valve, the first piston being responsive to the power fluid pressure for moving the first valve to vary the volume of the braking fluid pressure circuit; a second piston disposed in an opposite side of the cylinder and having an end on which the power fluid pressure acts and actuatable by the braking fluid pressure in response to failure of the power fluid pressure; and a second valve for communicating the inlet and outlet ports directly with each other in response to operation of the second piston.

Since the first and second pistons and the first and second valves are all accommodated in the single cylinder with its open end closed by the single closure member, the actuator is simple in construction. As the cylinder is close to the outer surfaces of the body, passages therein can be formed relatively easily. The series arrangement of the pistons and valves allows the passages to be defined in the cylinder with the pistons and valves disposed in the cylinder.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED ENBODIMENT

Figure 1:
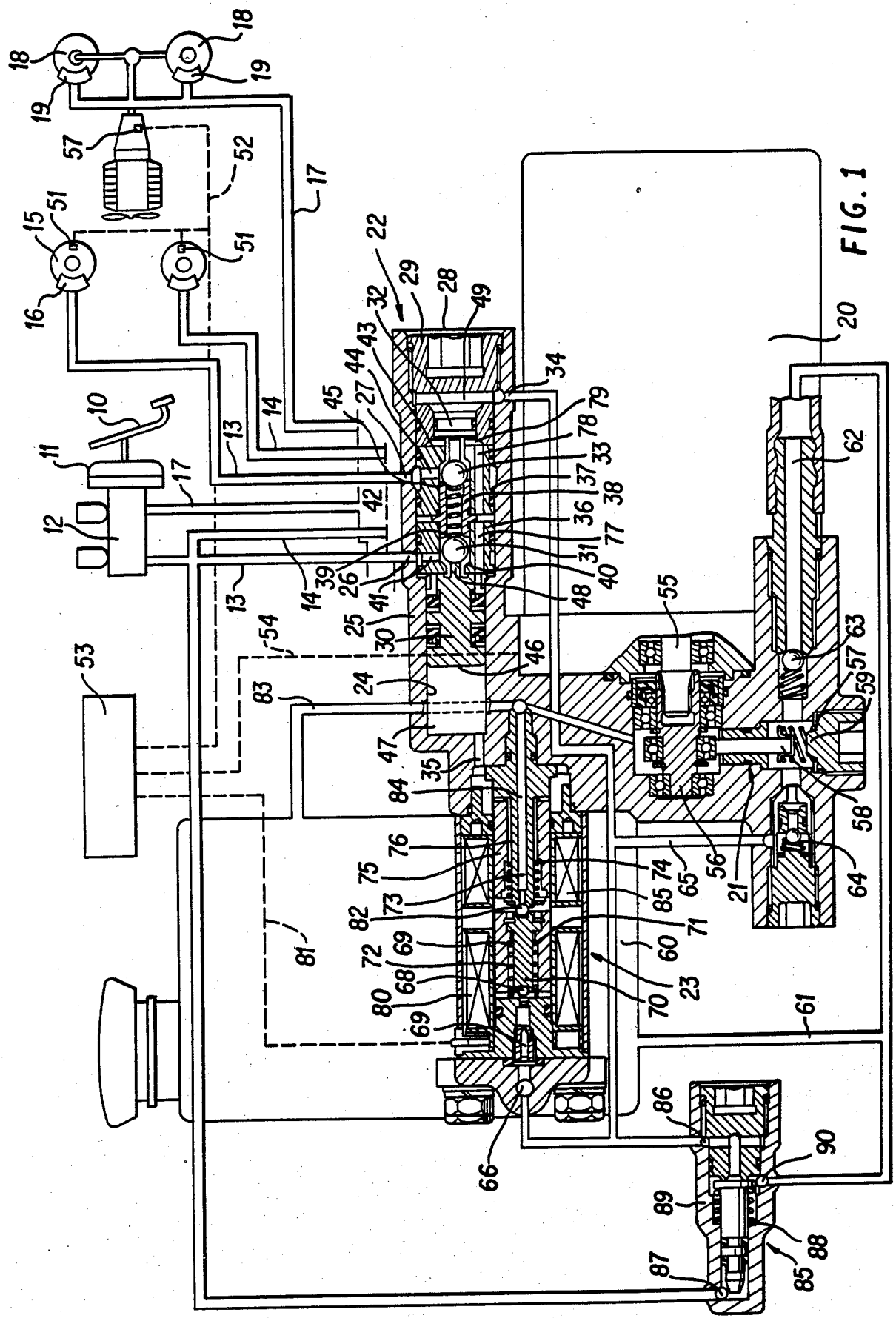
FIG. 1 is a diagrammatic view, partly on enlarged scale and in cross section, of an anti-skid braking control system according to the present invention.
Figure 2:
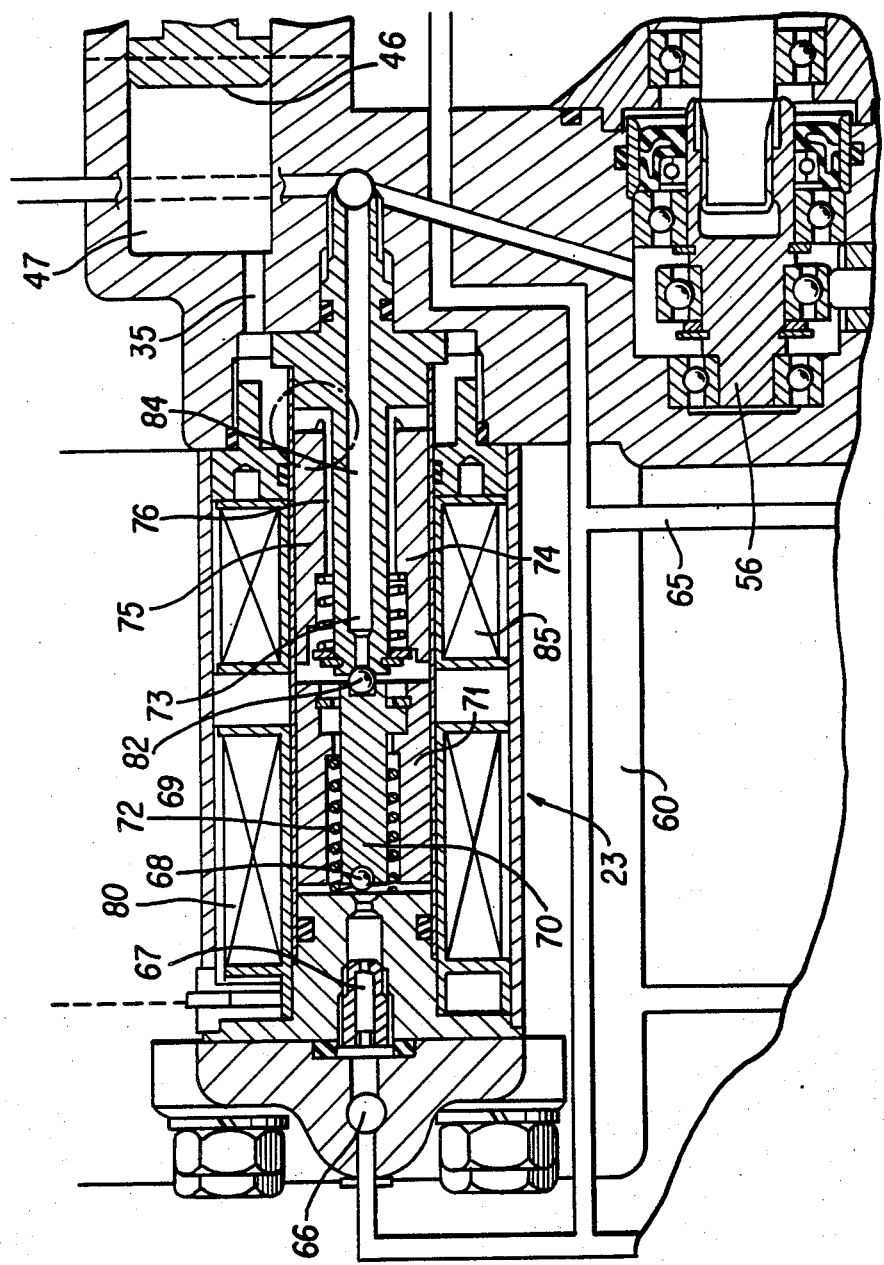
FIG. 2 is an enlarged view of the supply and discharge valve shown in FIG. 1 with the core being in a first position.
Figure 3:
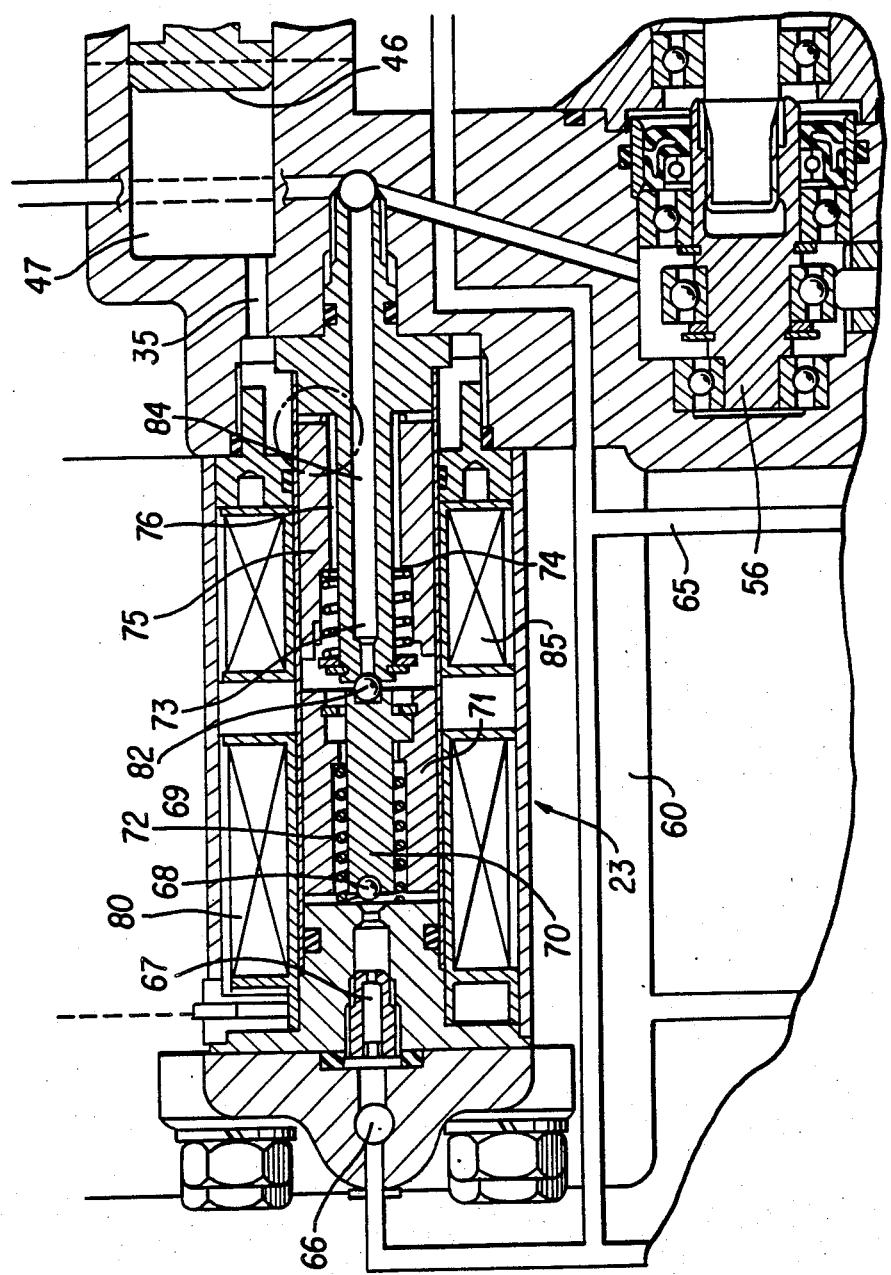
FIG. 3 is an enlarged view of the supply and discharge valve shown in FIG. 1 with the core being in a second position.

Designated in FIGS. 1, 2 and 3 is a brake pedal 10, a brake booster 11, and a tandem brake master cylinder 12. When the brake pedal 10 is depressed, the tandem brake master cylinder 12 generates a fluid pressure commensurate with the force with which the brake pedal 10 is depressed. The generated fluid pressure is supplied through braking fluid pressure supply circuits 13, 14 respectively to wheel brake actuating cylinders 16 on front wheels 15 and through a braking fluid pressure supply circuit 17 to wheel brake actuating cylinders 19 on rear wheels 18.

An anti-skid braking control system for preventing the front and rear wheels 15, 18 from being locked on the road generally comprises a fluid pressure pump 21 driven by a electric motor 20 for generating a power fluid pressure, an actuator 22 actuatable by the braking fluid pressure and the power fluid pressure, and a power fluid pressure supply and discharge valve 23 for supplying the power fluid pressure to and discharging the power fluid pressure from the actuator 22 dependent on wheel rotating conditions.

The actuator 22 has a body 25 having three cylinders 24 (only being shown in detail) defined therein and each having one open end 28, the three cylinders 24 being associated respectively with the front wheels 15, 15 and the rear wheels 18. The illustrated cylinder 24 which is combined with one of the front wheels 15 through the braking fluid pressure circuit 13 and will now be described in detail. The body 25 has an inlet port 26 connected through the braking fluid pressure circuit 13 to the brake master cylinder 12 and an outlet port 27 connected through the braking fluid pressure circuit 13 to the wheel brake actuating cylinder 16. The open end 28 of the cylinder 28 is closed off by a closure member such as a plug 29 threaded therein with a seal member interposed therebetween. A first piston 30 is slidably disposed in one side of the cylinder 24 and is movable back and forth under the braking fluid pressure and the power fluid pressure for increasing or reducing the volume of the braking fluid pressure circuit leading to the wheel brake actuating cylinder 16 to thereby modulate the braking fluid pressure. A first valve 31 is disposed centrally in the cylinder 24 for cutting off fluid communication between the inlet port 26 and the outlet port 27 in response to operation of the piston 30. A second piston 32 is slidably disposed in an opposite side of the cylinder 24 and movable under the braking fluid pressure and the power fluid pressure. A second valve 33 is also disposed in the cylinder 24, the second valve 33 beng actuatable by the second piston 32 for providing direct fluid communication between the inlet port 26 and the outlet port 27. The first piston 30, the first valve 31, the second piston 32, and the second valve 33 are disposed in series within the cylinder 24 which has a single bore step.

The body 25 also has a port 34 supplied with the power fluid pressure and another port 35 through which the power fluid pressure is supplied to or discharged from the cylinder 24 via the power fluid pressure supply and discharge valve 23. Fixed members 36, 37 are axially successively disposed in the cylinder 24 with seal members being interposed between the fixed members 36, 37 and the cylinder bore wall, the fixed member 36, 37 being positioned as shown by the plug 29. Another fixed member 38 is mounted in the fixed members 36, 37 with seal members interposed therebetween.

Each of the first and second valves 31, 32 is in the form of a ball. The first valve 31 is normally held in contact with a seat 40 on the fixed member 36 under the biasing force of a spring 39 having an end engaging the second valve 31. In this position, the inlet port 26 communicates with a passage 42 in the fixed member 38 through a passage 41 defined in the fixed member 36. The second valve 33 is normally positioned in abutment against a seat 43 on the fixed member 37 under the force of the spring 39. Therefore, the passage 42 is held in communication with the outlet port 27 through a passage 44 defined in the fixed member 37. Under this condition, the second valve 33 is unseated from a seat 45 on the fixed member 38.

The first piston 30 is slidably disposed in the cylinder 24 with seal members interposed between the first piston 30 and the cylinder bore wall. Under normal conditions, no power fluid pressure is supplied into a power chamber 47 defined by an end 46 of the piston 30 within the cylinder 24 and communicating with the port 35. Therefore, an opposite end 48 of the piston 30 does not unseat the first valve 31 from the seat 40 against the braking fluid pressure and the force of the spring 39. Under normal conditions, furthermore, no power fluid pressure is supplied into a power chamber 49 defined by a righthand end (as shown) of the piston 32 and communicating with the port 34. Therefore, a lefthand end of the piston 32 does not unseat the second valve 33 from the seat 43 against the braking fluid pressure and the force of the spring 39. Therefore, a normal braking action is effected while the inlet port 26 and the outlet port 27 are communicating with each other under the foregoing normal condition.

When one of the front wheels 15 is about to be locked while the motor vehicle is running, a wheel lock sensor 51 associated with front wheel 15 delivers a signal 52 to a computer 53 which generates an electric signal 54 for energizing the motor 20. The motor 20 is energized to rotate its output shaft 55 and an eccentric shaft 56 in unison therewith whereupon a plunger 58 biased by a spring 57 repeatedly reciprocates to increase and reduce the volume of a chamber 59. The power fluid pressure is now applied from an inlet port 62 communicating with a reservoir 60 through a pipe 61 into a pipe 65 via a check valve 63, a chamber 59, and a check valve 64.

The power fluid pressure is then delivered from the pipe 65 through the port 34 into the power chamber 49 in which the power fluid pressure acts on the piston 32 to move the same to the left, thereby displacing the second valve 33 to the illustrated position. The second valve 33 is then unseated from the seat 43 and seated on the seat 45. The power fluid pressure is also delivered from the pipe 65 into a port 66 of the power fluid pressure supply and discharge valve 23. The power fluid pressure is then transmitted from the port 66 into the power chamber 47 through a passage 67, a valve 68 as it is open, a passage 72 between movable cores 70, 71 biased by a spring 69, and a passage between a fixed member 73 and a movable core 75 biased by a spring 74. Therefore, the first piston 30 is shifted to the illustrated position to cause the end 48 thereof to unseat the first valve 31 from the seat 41. The inlet port 26 is then brought into communication with the outlet port 27 through the passage 41, passages 77, 78 defined in the fixed members 36, 37, a chamber 79 leftward of the second piston 32, and the second valve 33 positioned as illustrated.

After the power fluid pressure has been supplied to the actuator 22 through the power fluid pressure supply and discharge valve 23, the computer 54 generates an electric signal 81 for energizing a first solenoid 80 of the supply and discharge valve 23. The cores 70, 71 are now moved to the left against the resiliency of the spring 69 to enable the valve 68 to close the passage 67. As the core 70 is moved leftward, a valve 82 opens a passage 84 defined in the fixed member 73 to relieve the power fluid pressure from the power chamber 47 through a pipe 83 into the reservoir 60. The first piston 30 is then moved to the left from the illustrated position to allow the first valve 31 to be seated on the seat 40. Depending on the distance that the first piston 30 moves to the left thereafter, a portion of the braking fluid pressure circuit from the first valve 31 to the wheel brake actuating cylinder 16, including the passages 77, 78 the chamber 89, the passage 44, and the outlet port 27, is increased in volume to reduce the braking fluid pressure being applied to the wheel brake actuating cylinder 16. The electric signal 81 from the computer 53 is transmitted or cut off dependent on the rotating conditions of the wheel 15 to open or close the valve 68 for thereby moving the first piston 30 to control the braking fluid pressure to meet the rotating condition of the wheel 15.

A second solenoid 85 is also energized by the electric signal 81 from the computer 53 to move the core 75 against the force of the spring 74 between a position to restrict a passageway between the passage 76 and the port 35 and a position not to restrict the passageway. Such movement of the core 75 controls the speed of reciprocating movement of the first piston 30. Therefore, the characteristics of reducing and increasing the braking fluid pressure are made variable.

A regulator valve 85 has a port 86 connected to the pipe 75 for being supplied with the power fluid pressure, and a port 87 for being supplied with the braking fluid pressure from the brake master cylinder 12 through the braking fluid pressure circuit 13. The regulator valve 85 also has a valve 89 urged by a spring 88 to move in the rightward direction, a righthand end on which the power fluid pressure from the port 86 acts and a lefthand end on which the braking fluid pressure from the port 87 acts. The valve 89 is effective in controlling fluid communication between the port 86 and a port 90 leading to the reservoir 60. Therefore, the regulator valve 85 effects a regulating action so as to increase the power fluid pressure as the braking fluid pressure from the master cylinder 12 increases.

The anti-skid braking control system is illustrated as being of the open type in which no power fluid pressure is supplied to the actuator 22 upon normal braking. However, the anti-skid braking control system may be of the closed type in which the power fluid pressure is supplied to the actuator 22 upon normal braking. With the closed-type actuator, the power fluid pressure is supplied, under normal braking condition, into the power fluid pressure chamber 47 and the power chamber 49 by means of a valve disposed in a fluid-pressure circuit from an accumulator for storing the power fluid pressure from the pump 21 to the valve 23 and the power chambr 49. The valve opens the fluid-pressure circuit in response to the braking fluid pressure fed from the brake master cylinder 12 in the same manner as the regulator valve 85 supplies the power fluid pressure. Under normal conditions, the parts of the actuator 22 are positioned as illustrated. The braking fluid pressure is delivered from the inlet port 26 to the inlet port 27 via a passageway between the first valve 31 and the seat 40, the passages 77, 78, the chamber 79, a passageway between the second valve 33 and the seat 43, and the passage 44. For preventing the wheel from being locked when it is braked, the power fluid pressure is discharged by the valve 23 from the power fluid chamber 47 into the reservoir 60 to allow the first valve 31 to be seated on the seat 40 for thereby reducing the braking fluid pressure in the manner described above. If the power fluid pressure is lowered with respect to the braking fluid pressure due for example to a loss of the power fluid pressure, the second valve 33 is unseated from the seat 45 and seated on the seat 43, whereupon the inlet and outlet ports 26, 27 are communicated directly with each other. Therefore, the present invention is applicable to an anti-skid braking control system of the closed type with the actuator having the same construction as that illustrated.

Although a certain preferred embodiment has been shown and described, it should be understood that many changes and modifications may be made therein without departing from the scope of the appended claims.

What is claimed as new and desired to be secured by Letters Patent of the United States is:

1. An anti-skid braking control system, comprising:
   (a) a brake master cylinder;
   (b) a wheel brake actuating cylinder on a wheel;
   (c) a braking fluid pressure circuit interconnecting said brake master cylinder and said wheel brake actuating cylinder for applying a braking fluid pressure from said brake master cylinder to said wheel brake actuating cylinder;
   (d) an actuator disposed in said braking fluid pressure circuit for controlling the braking fluid pressure;
   (e) a fluid pressure source for generating a power fluid pressure to be supplied to said actuator; and
   (f) a power fluid pressure supply and discharge valve for supplying the power fluid pressure to and discharging the power fluid pressure from said actuator dependent on a skidding condition of the wheel wherein said actuator comprises a body having a cylinder with one end closed by a closure member; an inlet port defined in said body and opening into said cylinder; said inlet port being connected through said braking fluid pressure circuit to said brake master cylinder; an outlet port defined in said body and opening into said cylinder; said outlet being connected through said braking fluid pressure circuit to said wheel brake actuating cylinder; a first valve disposed centrally in said cylinder between said inlet and outlet ports for cutting off fluid communication therebetween; a first piston disposed in one side of said cylinder and having an end on which the power fluid pressure acts and an opposite end exposed in said braking fluid pressure circuit for engaging said first valve, said first piston being responsive to said power fluid pressure for moving said first valve to vary the volume of said braking fluid pressure circuit; a second piston disposed in an opposite side of said cylinder and having an end on which the power fluid pressure acts and actuated by the braking fluid pressure in response to failure of said power fluid pressure; and a second valve for communicating said inlet and outlet ports directly with each other in response to operation of said second piston.

2. An anti-skid braking control system according to claim 1, wherein said cylinder has a first passage leading from said inlet port through said first valve to said outlet port, and a second passage leading from said inlet port through said second valve to said outlet port, said second valve being actuatable by said second piston for opening said second passage and closing said first passage between said outlet port and said first valve.

3. An anti-skid braking control system according to claim 1, further comprising a common spring for seating said first valve on a first seat and unseating said second valve from a second seat.

4. An anti-skid braking control system according to claim 2, further comprising a common spring for seating said first valve on a first seat disposed in said first passage and unseating said second valve from a second seat disposed in said second passage and seating said second valve on said first seat disposed in said first passage.

5. An anti-skid braking control system according to claim 1, further comprising a fluid pressure circuit for returning a fluid discharged from a fluid pressure pump as said fluid pressure source to a reservoir, and a regulator valve disposed in said last-mentioned fluid pressure circuit and responsive to the braking fluid pressure from said brake master cylinder for restricting said last-mentioned fluid pressure circuit to regulate said power fluid pressure.

6. An anti-skid braking control system according to claim 1, further comprising a fluid pressure circuit for applying the power fluid pressure to said second piston, said last-mentioned fluid pressure circuit being held in communication with a power fluid pressure inlet port of said power fluid pressure supply and discharge valve.

7. An anti-skid braking control system according to claim 1, further comprising an electric motor for actuating said fluid pressure pump.

* * * * *